United States Patent
Koo et al.

(10) Patent No.: US 8,199,729 B2
(45) Date of Patent: Jun. 12, 2012

(54) MEDIA ACCESS CONTROL APPARATUS AND METHOD FOR GUARANTEEING QUALITY OF SERVICE IN WIRELESS LAN

(75) Inventors: Ki Jong Koo, Daejeon (KR); Dae Hwan Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 350 days.

(21) Appl. No.: 12/423,938

(22) Filed: Apr. 15, 2009

(65) Prior Publication Data

US 2009/0207825 A1    Aug. 20, 2009

Related U.S. Application Data

(63) Continuation of application No. 12/349,867, filed on Jan. 7, 2009, now Pat. No. 7,616,612, which is a continuation of application No. 10/917,684, filed on Aug. 12, 2004, now Pat. No. 7,489,666.

(30) Foreign Application Priority Data

Dec. 26, 2003   (KR) .................. 10-2003-0097155

(51) Int. Cl.
*H04J 3/00*  (2006.01)
(52) U.S. Cl. ........................................ 370/336; 370/332
(58) Field of Classification Search .............. 370/332, 370/336
See application file for complete search history.

(56) References Cited

U.S. PATENT DOCUMENTS

| 7,095,754 | B2 | 8/2006 | Benveniste | |
|---|---|---|---|---|
| 7,489,666 | B2 * | 2/2009 | Koo et al. | 370/336 |
| 7,616,612 | B2 * | 11/2009 | Koo et al. | 370/336 |
| 2002/0071413 | A1 | 6/2002 | Choi | |
| 2003/0072280 | A1 * | 4/2003 | McFarland et al. | 370/332 |
| 2004/0151144 | A1 * | 8/2004 | Benveniste | 370/336 |
| 2004/0170150 | A1 | 9/2004 | Guo et al. | |
| 2006/0045022 | A1 | 3/2006 | Kneckt et al. | |

OTHER PUBLICATIONS

"QoS Support MAC Technology for Wireless Home Networking" Korean Institute of Communication and Sciences, 2003, vol. 20-6, pp. 727-734.
Sunghyun Choi: Seoul National University, "Emerging IEEE 802.11e WLAN for Quality-of-Service (QoS) Provisioning," SK Telecom Telecommunications Review, vol. 12, No. 6, 2002, pp. 894-906.

* cited by examiner

*Primary Examiner* — Albert T Chou
(74) *Attorney, Agent, or Firm* — NSIP Law

(57) ABSTRACT

A media access control (MAC) apparatus and corresponding methods for guaranteeing quality-of-service in a wireless local area network (LAN) are presented. The MAC method includes the steps of extracting, performing, determining, a first transmitting step, and a second transmitting step. The extracting step includes extracting a user priority from a frame received from an upper layer and separately storing a voice frame and a non-voice frame according to an access category (AC). The performing step includes independently performing backoff operations for the voice frame and the non-voice frame. The determining step includes determining whether the backoff operations for the voice frame and the non-voice frame have simultaneously ended. The first transmitting step includes transmitting the voice frame having a higher priority first and performing the backoff operation for the non-voice frame if the backoff operations have simultaneously ended. The second transmitting step includes transmitting a frame whose backoff operation ends if the backoff operations have not simultaneously ended.

12 Claims, 5 Drawing Sheets

MEDIA ACCESS CONTROL APPARATUS AND METHOD FOR GUARANTEEING QUALITY OF SERVICE IN WIRELESS LAN

CROSS-REFERENCES TO RELATED PATENT APPLICATION

The present application claims priority under 35 U.S.C 119(a) to Korean Application No. 10-2003-0097155, filed on Dec. 26, 2003, in the Korean Intellectual Property Office, and to U.S. patent application Ser. No. 10/917,684, filed on Aug. 12, 2004, in which both are incorporated herein by reference in their entirety as set forth in full.

FIELD OF THE INVENTION

The present invention relates to a quality-of-service technology for a communication system, and more particularly, to an apparatus and method for guaranteeing quality-of-service in a wireless local area network (LAN).

DESCRIPTION OF THE RELATED ART

A voice-over-Internet protocol (VoIP) technology represents an IP telecommunication technology used when a plurality of facilities transfer voice information using an IP. In general, the VoIP technology deals with not a conventional protocol based on circuit as used for a public switched telephone network (PSTN) but a protocol for sending voice information with a digital format in discontinuous packets. Therefore, since packet transmission is discontinuously achieved, it is difficult to guarantee quality-of-service (QoS).

The QoS of voice information must be guaranteed for VoIP services. Accordingly, an IEEE 802.11 wireless LAN media access control (MAC) technology has recently been suggested as a new LAN technology for guaranteeing the QoS.

However, the IEEE 802.11 MAC technology cannot support frames to which discriminated user priorities are applied. Basically, when a channel access right is granted, a distributed coordination function (DCF) provides the same proportional channel access right to all stations contending for channels in a basic service set (BSS). However, the same proportional channel access right is not preferable for stations having different user priorities. Therefore, from the point of view of the QoS, the MAC technology must discriminately deal with frames having different priorities and provide a QoS field included in a frame header.

SUMMARY OF THE INVENTION

The present invention provides a media access control (MAC) apparatus for guaranteeing quality-of-service (QoS) in a wireless local area network (LAN), which can guarantee the QoS of VoIP services with a relatively simple method in a wireless LAN environment, and a method thereof.

According to an embodiment of the present invention, there is provided a media access control (MAC) apparatus comprising: a first transmission queue storing a voice transmission frame; a second transmission queue storing a general transmission frame; a frame handler extracting user priority information from a frame input from an upper layer, mapping the frame to a relevant access category (AC), and storing the frame in the first transmission queue or the second transmission queue; a MAC controller determining a backoff operation timing and a frame transmission timing by checking a media status; a first arbitration inter-frame space (AIFS) timer and a second AIFS timer, each reducing a predetermined timer value set by the MAC controller by a predetermined value unit; a first backoff block and a second backoff block, each performing a separate backoff operation for each AC using a predetermined backoff count value; a contention resolution unit, which transmits the voice frame having a higher user priority first and gives up transmission of the non-voice frame when two ACs simultaneously end the backoff operations; a frame detector, which determines whether or not to transmit ACK by checking an ACK policy bit from a header of the received frame when a frame is received from a physical layer; and a receive queue storing the received frame and transmitting the frame to the upper layer.

According to another embodiment of the present invention, there is provided a media access control (MAC) method comprising: extracting a user priority from a frame received from an upper layer and separately storing a voice frame and a non-voice frame according to an access category (AC); independently performing backoff operations for the voice frame and the non-voice frame; determining whether the backoff operations for the voice frame and the non-voice frame have simultaneously ended; if the backoff operations have simultaneously ended, transmitting the voice frame having a higher priority first and performing the backoff operation for the non-voice frame; and if the backoff operations have not simultaneously ended, transmitting a frame whose backoff operation ends.

According to another embodiment of the present invention, there is provided a media access control (MAC) method comprising: receiving a frame from a physical layer; decoding an ACK policy from a header of the frame and determining whether or not to perform an ACK response based on the decoded ACK policy; when the ACK response must be performed, transmitting an ACK frame and storing the received frame in a receive queue; and when a host is ready, transmitting the frame to an upper layer regardless of a priority.

Accordingly to yet another embodiment of the present invention, there is provided a computer-usable medium having computer readable instructions stored thereon for execution by a processor in a wireless communication system to perform a media access control (MAC) method comprising: extracting a user priority from a frame received from an upper layer; mapping the frame to an access category (AC) based on the user priority; storing a voice frame exclusively in a first transmit queue, and storing a non-voice frame in a second transmit queue according to the AC; performing independently backoff operations in the first transmit queue and the second transmit queue; checking whether or not the independent backoff operations simultaneously end; transmitting the voice frame having a higher priority and invoking backoff operation for the non-voice frame when backoff operations simultaneously end; and transmitting a frame whose backoff operation ends first when backoff operations do not simultaneously end. The computer-usable medium of this embodiment may optionally further comprising adding a header having an acknowledgement (ACK) policy information to the frame before transmitting the frame. An arbitration inter-frame space (AIFS) of the voice frame can be longer than the one of the non-voice frame. The ACK policy information can be included in a QoS Control field of the header. Further, the ACK policy information can be associated with whether or not a receiver should transmit an ACK response. According to still yet another embodiment of the present invention, there is provided a computer-usable medium having computer readable instructions stored thereon for execution by a processor in a wireless communication system to perform a media access control method comprising: extracting a user priority from frames received from an upper layer; classifying the frames into at least two groups based on the user priority; storing the frames respectively in at least two transmit queues corresponding to the groups; performing independently backoff operations in the transmit queues; checking whether or not the independent backoff operations simultaneously end; transmitting a frame having a higher priority and invoking a backoff operation for a frame having a lower priority when at least two of the backoff operations simultaneously end; and transmitting a frame whose backoff operation ends first when the backoff operations do not simultaneously end. This embodiment of the computer-usable medium may also further comprise adding a header having an acknowledgement (ACK) policy information to the frame before transmitting the frame. Further the ACK policy information may also be included in a QoS Control field of the header in which the ACK policy information is associated with whether or not a receiver should transmit ACK.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which embodiments of the invention are shown.

Figure 1:
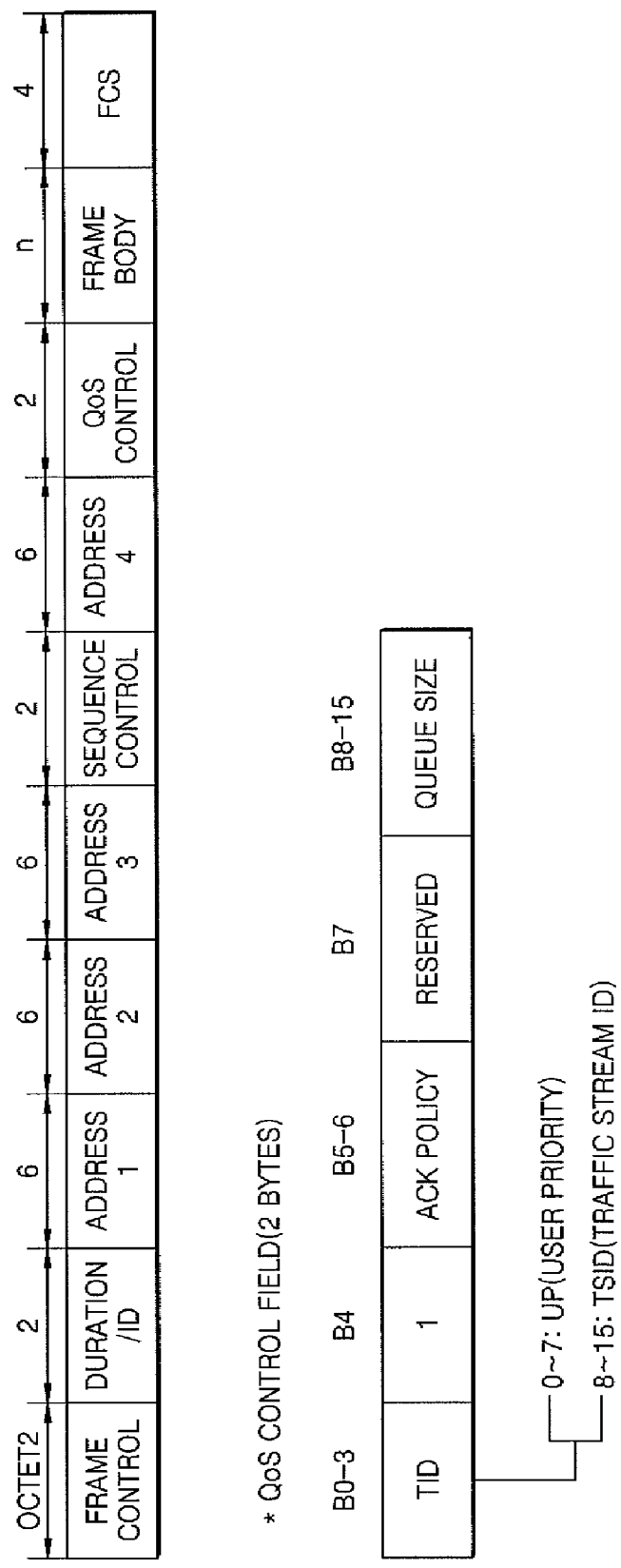
FIG. 1 illustrates configurations of a header of a MAC frame and a QoS control field included in the header of the MAC frame.
Figure 2:
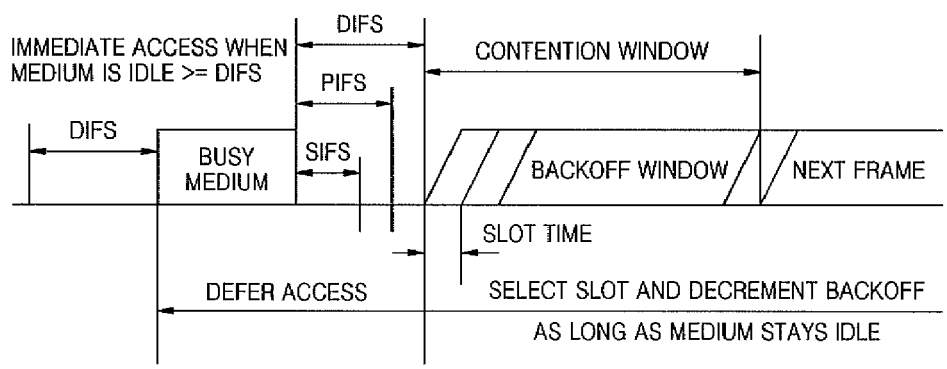
FIG. 2 illustrates a procedure for performing an IEEE 802.11 DCF.

FIG. 1 illustrates configurations of a header of a MAC frame and a QoS control field included in the header of the MAC frame. FIG. 2 illustrates a procedure for performing an IEEE 802.11 DCF.

An IEEE 802.11 MAC is based on a logic function called a coordination function. The coordination function determines whether a station transmits or receives a frame in a basic service set (BSS). The coordination function is divided into two functions, such as a distribution coordination function (DCF) based on a contention method and a point coordination function (PCF) based on a poll-response method, according to a method of obtaining a channel access right. Today, most 802.11 apparatuses operate using the DCF.

The 802.11 DCF operates with one transmission queue and is located in a distributed MAC having a local evaluation function with which a channel status can be evaluated in order to support a carrier sense multiple access collision avoidance (CSMA/CA) protocol.

Referring to FIG. 1, since a QoS control field is included in a header of a MAC frame, one of a plurality of priority values can be carried in the QoS control field. If a host or a router sending traffic to a LAN grants an appropriate priority for an individual packet to be transmitted, LAN devices, such as switches, bridges, and hubs, appropriately deal with the packet.

Referring to FIG. 2, if a channel is busy when a frame arrives in a transmission queue from an upper layer, after a MAC apparatus waits until a medium is idle, the MAC apparatus waits during a DCF inter-frame space (DIFS) time. If the channel is still idle after the DIFS time lapses, the MAC apparatus performs a backoff operation (transmission wait and try) to obtain a channel access right using a random backoff counter.

If the medium is idle during every slot time, the MAC apparatus decreases a random backoff count value, and if the count value becomes 0, the MAC apparatus transmits the frame. If the transmission queue is empty and the channel is idle for longer than the DIFS time when a frame arrives in the transmission queue, the MAC apparatus immediately transmits the frame without the backoff operation. If the channel becomes busy during the backoff operation, the MAC apparatus stops the backoff operation, and if the channel is continuously idle during the DIFS time, the MAC apparatus performs the backoff operation from the last backoff count value again.

Each station maintains a contention window (CW), which uses the random backoff count value. The backoff count value is a pseudo random integer selected with an even probability in a range of [0, CW]. The CW is initialized to CWmin and increases by CW=2(CW+1)−1 whenever transmission fails. This is a method for reducing a collision proportion when a plurality of stations try to transmit. The CW is set to at most CWmax, and after frame transmission normally ends, the CW is initialized to CWmin. Also, even if a frame waiting for transmission is not in the transmission queue, a station, which has transmitted all data, waits during the DIFS time, performs the backoff operation, and ends a transmission process.

If a station successfully receives a frame, after a short inter-frame space (SIFS) time lapses, the station indicates that it has received the frame by immediately transmitting an ACK frame. If a station does not receive the ACK frame after transmitting data, the station performs retransmission after the random backoff operation.

As described above, in the IEEE 802.11 MAC apparatus, if the MAC apparatus includes only one transmission queue, since a subsequent frame can be transmitted only after the transmission of a preceding frame ends, when the transmission of the preceding frame is delayed, it is difficult to guarantee QoS. This problem can be solved with a plurality of queues. The IEEE 802.11e standard recommends more than 4 classes of queues in a case of an access point (AP) supporting a point-to-multipoint access. Also, the DCF of the IEEE 802.11 MAC standard uses DIFS, CWmin, and CWmax, in which priorities are not considered. Since the MAC standard performs the backoff operation during a relatively long time for a frame requiring QoS, it is difficult to guarantee the QoS.

Also, since the DCF of the IEEE 802.11 MAC standard ends a frame transmission process only if an ACK response is received with respect to all data and a management frame, the DCF is not suitable for a frame requiring QoS in which transmission timing is more important than transmission quality. This problem can be solved by limiting the ACK response for a frame for which the QoS is required.

Therefore, in an embodiment of the present invention, to solve a QoS problem of a terminal supporting a VoIP service with two classes of transmission queues, for real-time traffic such as an access category 3 (AC-3), a queue for VoIP exclusive use is used, an AIFS[3] parameter, a CWmin[3] parameter, and a CWmax[3] parameter are used to guarantee a higher priority, and an ACK response in response to a transmitted VoIP frame is not received. For general traffic, to support priorities of all frames except the VoIP frame, an AIFS[AC] parameter, a CWmin[AC] parameter, and a CWmax[AC] parameter are used according to the AC, and an ACK response may be received or not. A configuration of a MAC apparatus having the features described above will now be described.

Figure 3:
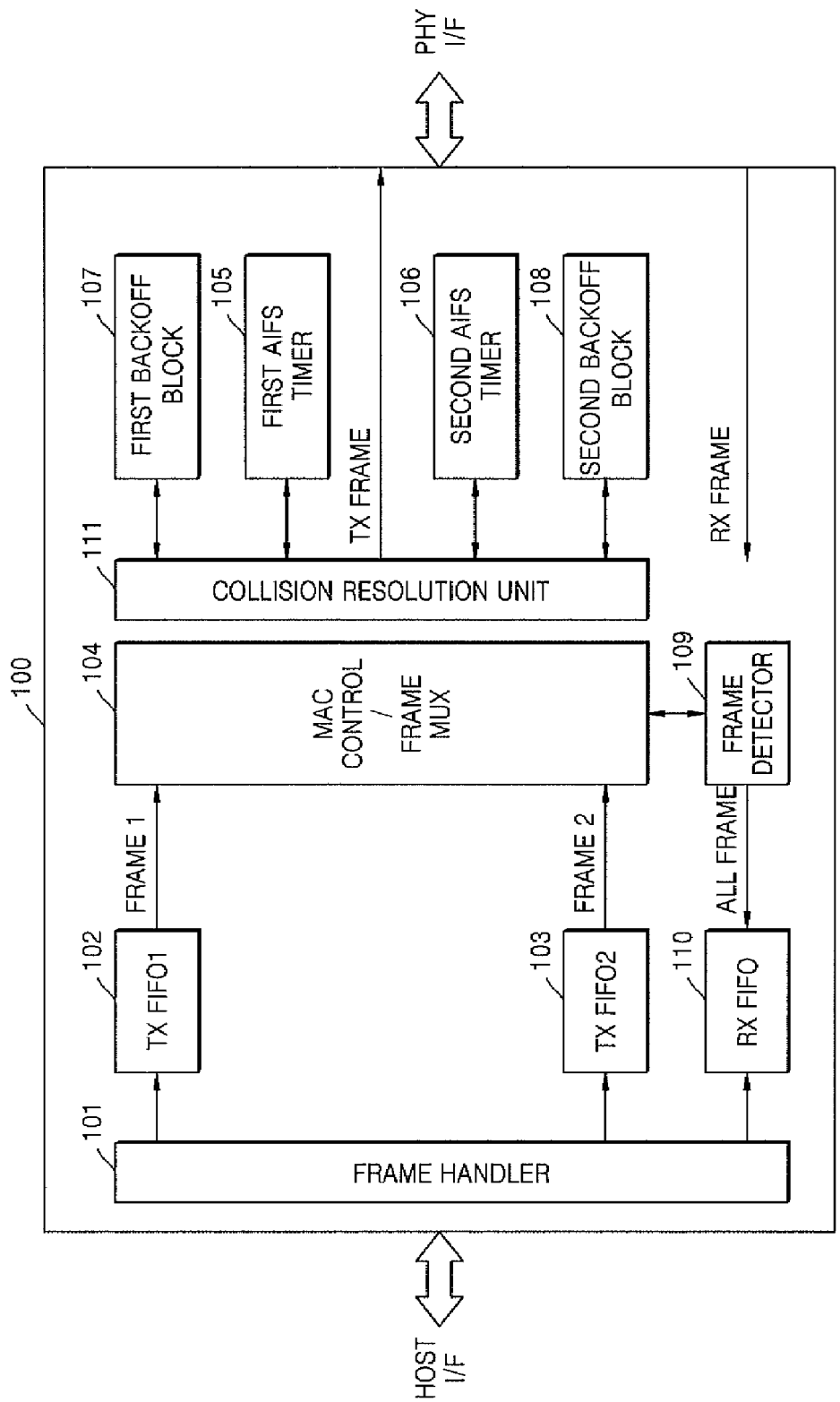
FIG. 3 is a block diagram of a MAC apparatus for supporting QoS in a wireless LAN according to an exemplary embodiment of the present invention.

FIG. 3 is a block diagram of a MAC apparatus 100 for supporting QoS in a wireless LAN according to an exemplary embodiment of the present invention. The MAC apparatus 100 is an IEEE 802.11 wireless LAN MAC apparatus 100 suitable for a terminal supporting a VoIP service.

Referring to FIG. 3, the MAC apparatus 100 includes a frame handler 101, first and second transmission queues 102 and 103, a MAC controller 104, first and second arbitration inter-frame space (AIFS) timers 105 and 106, first and second backoff blocks 107 and 108, a frame detector 109, a receive queue 110, and a collision resolution unit 111. Here, the first transmission queue 102 is composed of a voice frame transmission first-in-first-out (FIFO), and the second transmission queue 103 is composed of a non-voice frame transmission FIFO. The receive queue 110 is also composed of a FIFO.

When a frame is received from an upper layer, the frame handler 101 extracts user priority (UP) information from a traffic ID (TID) included in a QoS control field (refer to FIG. 1) of a frame header, and if the frame is a voice frame, the frame handler 101 maps the frame to AC[3], and if the frame is a non-voice frame, the frame handler 101 maps the frame to AC[0]-AC[2]. Also, if the frame is a voice frame, the frame handler 101 stores the frame in the first transmission queue 102, which is the voice frame exclusive transmission FIFO, and if the frame is a non-voice frame, the frame handler 101 stores the frame in the second transmission queue 103, which is the non-voice frame transmission FIFO.

If it is determined by the frame handler 101 that the AC is 3 and a voice frame transmission request is generated, the MAC controller 104 checks a medium status and determines a backoff operation timing and a frame transmission timing. Also, when the frame transmission request is generated, if the medium is busy, the MAC controller 104 waits until the medium is idle and sets the first and second AIFS timers 105 and 106 to an SIFS+AIFS[3] slot time according to the AC[3]. If the frame is a voice frame, a set value of the first AIFS timer 105 is the same as a value of a priority inter-frame space (PIFS).

Each of the timers 105 and 106 is a timer for reducing the set value (SIFS+AIFS[3] slot time) in units of 1 μs. If the medium is still idle after the timer value becomes 0, the MAC controller 104 commands a relevant backoff block to perform a backoff operation on the frame. If two frames having different ACs are in the first and second transmission queues 102 and 103, respectively, and if separate frame transmission requests are generated, the MAC controller 104 commands the first and second backoff blocks 107 and 108 to independently perform backoff operations on the two frames.

Each of the first and second backoff blocks 107 and 108 uses a pseudo random integer evenly distributed in a range of [0, CW] as a backoff count value. At this time, the CW is initialized with CWmin[AC] and increases by CW=2(CW+1)−1 whenever frame transmission fails. The CW has CWmax[AC] as a maximum value, and even if frame transmission fails, the CW does not increase more than CWmax [AC]. Each of the first and second backoff blocks 107 and 108 starts a backoff operation using a backoff count value selected by the method described above, decreases a random backoff count value in every slot time in which the medium is idle while performing the backoff operation, and informs the MAC controller 104 of the end of the backoff operation if the random backoff count value becomes 0.

If the MAC controller 104 is informed of the end of the backoff operation, the MAC controller 104 transmits a frame of the AC for which the backoff operation is performed to a physical layer. At this time, if two ACs simultaneously end the backoff operations, the collision resolution unit 111 transmits a voice frame having a higher UP first and gives up transmission of other non-voice frames. The collision resolution unit 111 commands the second backoff block 108 to perform the backoff operation again using an increased CW value for the other non-voice frame.

Also, when a transmission request is generated, if the medium is in a waiting status during the AFIS[AC] or performing the backoff operation, the MAC controller 104 waits until the medium is idle. When the medium is idle, the MAC controller 104 sets one of the first and second AIFS timers 105 and 106 to an AIFS timer value according to an AC value and waits until the AIFS timer value becomes 0. If the medium is still idle after the AFIS[AC] time lapses, the MAC controller 104 starts a backoff operation by selecting one of the first and second backoff blocks 107 and 108. If the medium is idle during every slot time while performing the backoff operation, the MAC controller 104 decreases a random backoff count value. If the random backoff count value becomes 0, the MAC controller 104 transmits a frame.

Also, when a transmission request is generated, if the medium is idle for a longer time than the AFIS[AC] time, the MAC controller 104 immediately transmits a frame.

When a frame is received from the physical layer, the frame detector 109 determines whether or not to transmit an ACK frame by checking an ACK policy bit (refer to FIG. 1) included in the QoS control field of the frame header.

Also, if the received frame is a beacon frame transmitted from the AP, the frame detector 109 extracts parameters related to the QoS (For example, AIFS[AC], CWmin[AC], and CWmax[AC]) and updates existing values.

The receive queue 110 is composed of one FIFO, stores a frame, and transmits a relevant frame to the upper layer whatever UPs of received frames are.

Figure 4:
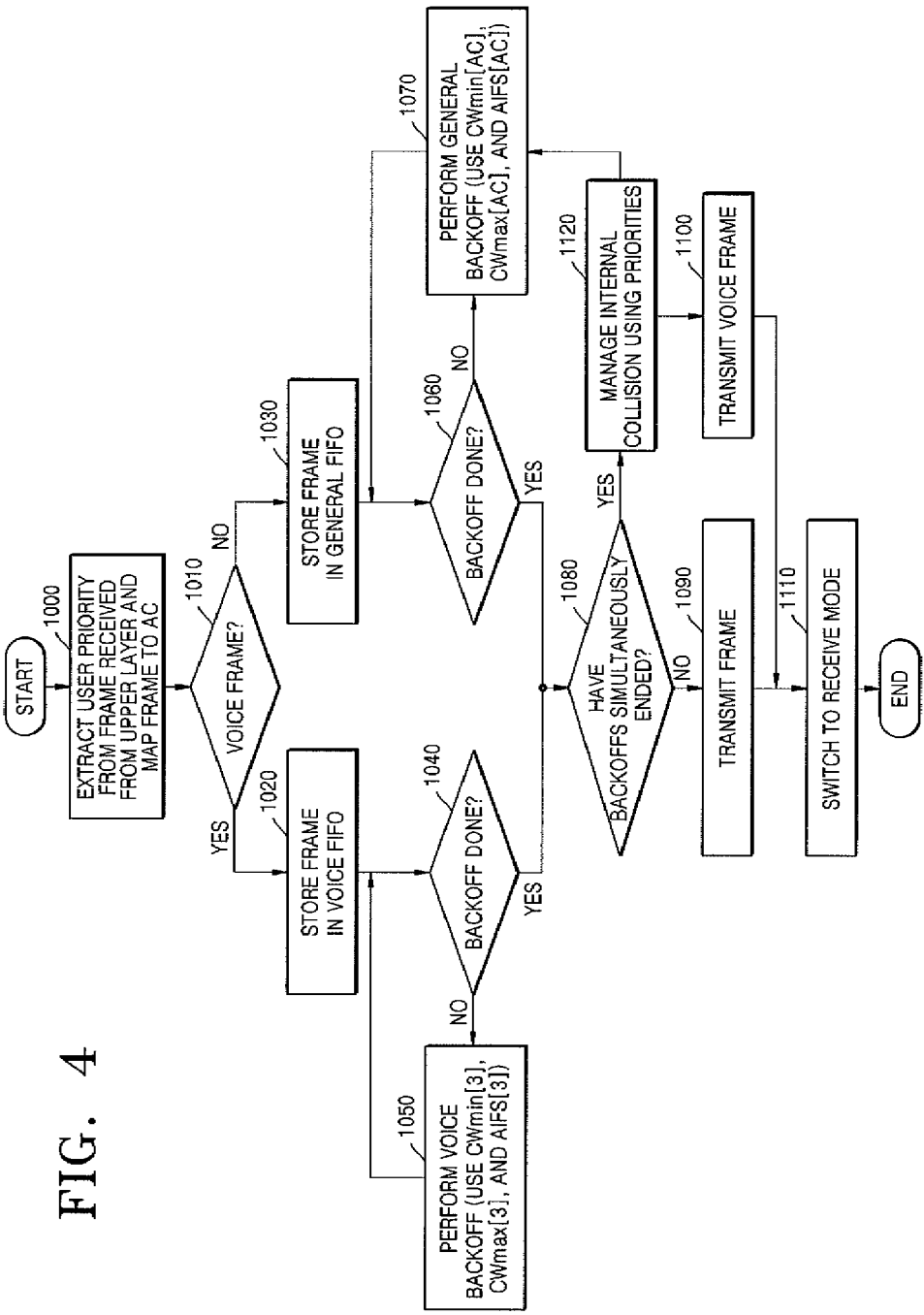
FIGS. 4 and 5 are flowcharts illustrating methods of supporting QoS in a wireless LAN, which are performed in the MAC apparatus shown in FIG. 3, according to exemplary embodiments of the present invention.
Figure 5:
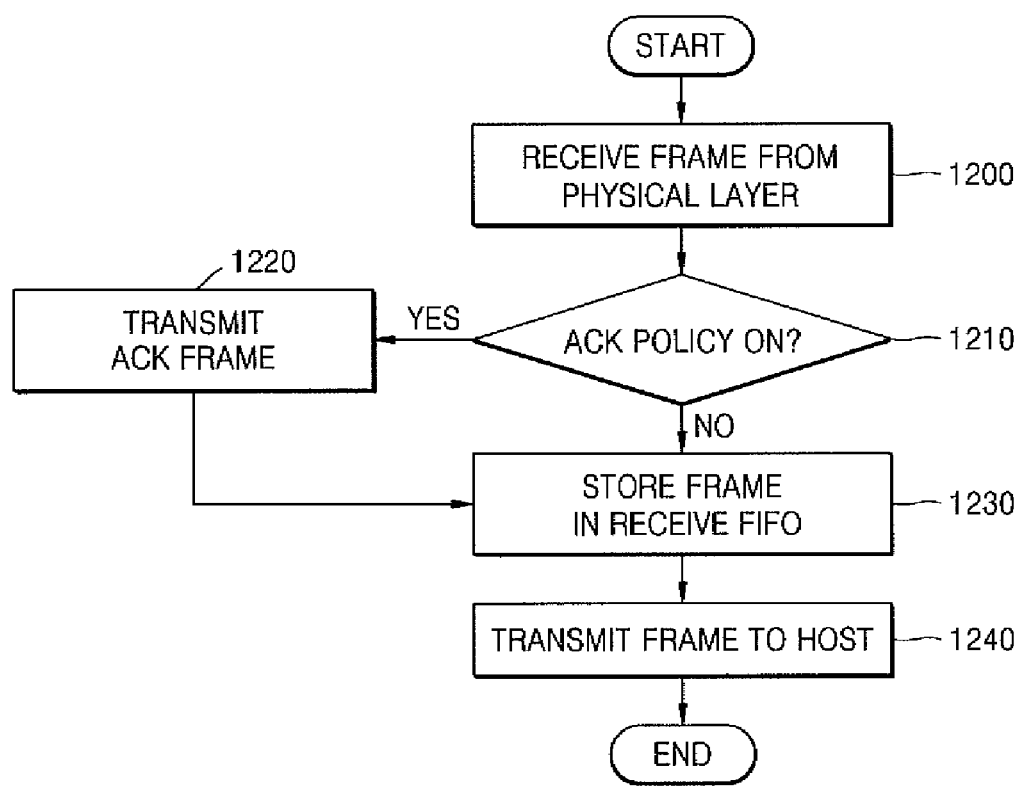

FIGS. 4 and 5 are flowcharts illustrating methods of supporting QoS in a wireless LAN, which are performed in the MAC apparatus 100 shown in FIG. 3, according to exemplary embodiments of the present invention. FIG. 4 illustrates a processing method of the MAC apparatus 100, that is performed in response to a frame received from an upper layer, and FIG. 5 illustrates a processing method of the MAC apparatus 100, that is performed in response to a frame received from a physical layer.

First, referring to FIG. 4, the MAC apparatus 100 determines a user priority (UP) of a frame input from an upper layer and maps the frame to an access category (AC) in step 1000. The MAC apparatus 100 determines whether the input frame is a voice frame in step 1010.

If the input frame is a voice frame corresponding to an AC[3] in step 1010, the MAC apparatus 100 stores the frame in the first transmission queue 102, which is a voice exclusive FIFO, in step 1020. If the input frame is a non-voice frame corresponding to one of AC[0]-AC[2] in step 1010, the MAC apparatus 100 stores the frame in the second transmission queue 103, which is a general FIFO, in step 1030.

After the voice frame is stored in the first transmission queue 102 in step 1020, it is determined whether a backoff operation has ended in step 1040, and if the backoff operation has not ended in step 1040, the MAC apparatus 100 performs the backoff operation of the voice frame using CWmin[3], CWmax[3], and AIFS[3] in step 1050. It is determined whether a backoff operation has ended again in step 1040, and if the backoff operation has ended, the MAC apparatus 100 performs step 1080.

On the other hand, after the non-voice frame is stored in the second transmission queue 103 in step 1030, it is determined whether a backoff operation has ended in step 1060, and if the backoff operation has not ended in step 1060, the MAC apparatus 100 performs the backoff operation of the non-voice frame using CWmin[AC], CWmax[AC], and AIFS[AC] according to the AC in step 1070. It is determined whether a backoff operation has ended again in step 1060, and if the backoff operation has ended, the MAC apparatus 100 performs step 1080.

It is determined whether the backoff operations of the voice frame and the non-voice frame have simultaneously ended in step 1080. If a single backoff operation ends in step 1080, the MAC apparatus 100 transmits the frame whose backoff operation ends regardless of priority in step 1090, and when the frame transmission ends, the MAC apparatus 100 switches to a receive mode in step 1110.

If it is determined that the backoff operations has simultaneously ended in step 1080, the MAC apparatus 100 performs internal collision management to which the priority is applied in step 1120. That is, the MAC apparatus 100 transmits the voice frame first by applying the priority to the internal collision management in step 1100 and allows the backoff operation to be performed by increasing a backoff count in step 1070. When the frame transmission ends, the MAC apparatus 100 switches to the receive mode in step 1110.

The processing method of the MAC apparatus 100 in response to a frame received from a physical layer will now be described with reference to FIG. 5.

Referring to FIG. 5, the MAC apparatus 100 receives a frame from a physical layer in step 1200. The MAC apparatus 100 decodes an ACK policy from a header of the received frame and determines whether an ACK response is performed using the ACK policy in step 1210. If the ACK response must be performed as a result determined in step 1210, the MAC apparatus 100 transmits the ACK response in step 1220 and stores the received frame in the receive queue 110 in step 1230. When a host is ready, the MAC apparatus 100 transmits the frame to the upper layer regardless of priority in step 1240.

As described above, in a MAC apparatus and method for guaranteeing QoS in a wireless LAN according to embodiments of the present invention, for a real-time traffic VoIP such as an AC-3, a VoIP exclusive queue is used (refer to the reference number 102 of FIG. 3), and a back operation is performed using AIFS[3], CWmin[3], and CWmax[3] parameters corresponding to the AC-3 to guarantee a higher priority. For simultaneously generatable non-real-time traffic, a backoff operation is performed using AIFS[AC], CWmin[AC], and CWmax[AC] parameters according to the AC to support all priorities except the VoIP traffic. Also, when the back operations are simultaneously ended by the two transmission requests that are simultaneously generated, QoS is guaranteed by transmitting the VoIP traffic having a higher priority first.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Accordingly, it is envisioned that the computer-readable medium may include any known computer-readable media such as an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. It is also envisioned that the computer-readable medium could even be paper or another suitable medium upon which a program is printed, in that the printed program can be electronically captured, via, say for example, optical scanning of the paper or other medium, then subsequently compiled, interpreted, or otherwise processed in a suitable manner, if necessary, and then subsequently being stored in a computer memory. Accordingly, the computer-readable medium may be any medium that can contain, store, communicate, propagate, or transport the program for use by or in connection with the instruction execution system, apparatus, or device.

As described above, according to a MAC configuring method for guaranteeing QoS in a wireless LAN according to an embodiment of the present invention, a wireless LAN MAC, in which functions are simplified while guaranteeing QoS of a VoIP service, can be provided. Therefore, it becomes easy to manufacture commercial chip with low costs, and a terminal supporting a wireless VoIP service with a low price can be mass-produced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A media access control (MAC) method in a MAC apparatus comprising:
    extracting a user priority from a frame received from an upper layer
    and separately storing a voice frame and a non-voice frame according to an access category (AC);
    independently performing backoff operations for the voice frame and the non-voice frame;
    checking whether or not the backoff operations simultaneously end;
    when the backoff operations simultaneously end, transmitting the voice frame having a higher priority and invoking backoff operation for the non-voice frame; and
    when the backoff operations do not simultaneously end, transmitting a frame whose backoff operation ends first, and
    wherein the transmitted frame comprises a header having an acknowledgement (ACK) policy information field representing whether or not a receiver should transmit an ACK response.

2. The method of claim 1, wherein Arbitration inter-frame space (AIFS) of the voice frame is shorter than the one of the non-voice frame.

3. The method of claim 2, wherein the ACK policy information is included in a QoS Control field of the header.

4. A media access control method in a MAC apparatus comprising:
    extracting a user priority from frames received from an upper layer;

classifying the frames into at least two groups based on the user priority;

storing the frames respectively in at least two transmit queues corresponding to the groups;

independently performing backoff operations in the transmit queues;

checking whether or not the independent backoff operations simultaneously end;

when at least two of the backoff operations simultaneously end, transmitting a frame having a higher priority and invoking backoff operation for a frame having a lower priority; and when the backoff operations do not simultaneously end, transmitting a frame whose backoff operation ends first, and wherein the transmitted frame comprises a header having an acknowledgement (ACK) policy information field representing whether or not a receiver should transmit an ACK response.

5. The method of claim 4, wherein the ACK policy information is included in a QoS Control field of the header.

6. A method for transmitting an acknowledgement (ACK) response in a receiver comprising:

receiving a frame from a transmitter through a physical layer;

extracting an ACK policy information field from a quality of service (QoS) control field of a header of the frame;

checking whether or not to transmit an ACK response to the transmitter based on the ACK policy information field;

when the ACK response is necessary, transmitting a ACK response to the transmitter and storing the frame in a receive queue;

when the ACK response is not necessary, storing the frame in the receive queue without transmitting the ACK response; and transmitting the frame to an upper layer.

7. A non-transitory computer-readable medium having computer readable instructions stored thereon for execution by a processor in a wireless communication system to perform a media access control (MAC) method comprising:

extracting a user priority from a frame received from an upper layer, and separately storing a voice frame and a non-voice frame according to an access category (AC);

performing independently backoff operations for the voice frame and the non-voice frame;

checking whether or not the backoff operations simultaneously end;

transmitting the voice frame having a higher priority and invoking backoff operation for the non-voice frame when backoff operations simultaneously end; and transmitting a frame whose backoff operation ends first when backoff operations do not simultaneously end, and wherein the transmitted frame comprises a header having an acknowledgement (ACK) policy information field representing whether or not a receiver should transmit an ACK response.

8. The non-transitory computer-readable medium of claim 7, wherein an arbitration inter-frame space (AIFS) of the voice frame is shorter than the one of the non-voice frame.

9. The non-transitory computer-readable medium of claim 8, wherein the ACK policy information is included in a QoS Control field of the header.

10. A non-transitory computer-readable medium having computer readable instructions stored thereon for execution by a processor in a wireless communication system to perform a media access control method comprising:

extracting a user priority from frames received from an upper layer;

classifying the frames into at least two groups based on the user priority;

storing the frames respectively in at least two transmit queues corresponding to the groups;

performing independently backoff operations in the transmit queues;

checking whether or not the independent backoff operations simultaneously end;

transmitting a frame having a higher priority and invoking a backoff operation for a frame having a lower priority when at least two of the backoff operations simultaneously end; and transmitting a frame whose backoff operation ends first when the backoff operations do not simultaneously end, and wherein the transmitted frame comprises a header having an acknowledgement (ACK) policy information field representing whether or not a receiver should transmit an ACK response.

11. The non-transitory computer-readable medium of claim 10, wherein the ACK policy information is included in a QoS Control field of the header.

12. A non-transitory computer-readable medium having computer readable instructions stored thereon for execution by a processor to perform a method of transmitting an acknowledgement (ACK) response in a receiver of a wireless communication system comprising:

receiving a frame from a transmitter through a physical layer;

extracting an ACK policy information field from a quality of service (QoS) control field of a header of the frame;

checking whether or not to transmit the ACK response to the transmitter based on the ACK policy information field;

transmitting the ACK response to the transmitter and storing the frame in a receive queue when the ACK response is necessary;

storing the frame in the receive queue without transmitting the ACK response when the ACK response is not necessary; and transmitting the frame to an upper layer.

* * * * *